United States Patent [19]
Lee

[11] Patent Number: 6,140,724
[45] Date of Patent: Oct. 31, 2000

[54] VIBRATION MOTOR

[75] Inventor: In Ho Lee, Suwon, Rep. of Korea

[73] Assignee: Samsung Electro-Mechanics Co., LTD, Kyungki-Do, Rep. of Korea

[21] Appl. No.: 09/339,626

[22] Filed: Jun. 24, 1999

[30] Foreign Application Priority Data

Dec. 30, 1998 [KR] Rep. of Korea ............... 98-60594

[51] Int. Cl.$^7$ .................................................. H02K 7/075
[52] U.S. Cl. .............................. 310/81; 310/40 MM
[58] Field of Search ...................... 310/40 MM, 81, 310/67 R, 91, 231, 233, 238, 242, 245, 247; 29/596, 597, 598

[56] References Cited

U.S. PATENT DOCUMENTS

| | | | |
|---|---|---|---|
| 5,107,155 | 4/1992 | Yamaguchi | 310/81 |
| 5,341,057 | 8/1994 | Yamaguchi et al. | 310/81 |
| 5,780,947 | 7/1998 | Fukuoka et al. | 310/40 MM |
| 5,952,745 | 9/1999 | Yasuda | 310/40 MM |

FOREIGN PATENT DOCUMENTS

| | | |
|---|---|---|
| 406253502A | 9/1994 | Japan . |
| 409084298A | 3/1997 | Japan . |
| 411098756A | 4/1999 | Japan . |

*Primary Examiner*—Nick Ponomarenko
*Assistant Examiner*—Tran N Nguyen
*Attorney, Agent, or Firm*—Darby & Darby

[57] ABSTRACT

Disclosed is a vibration motor. The vibration motor comprises a case; a housing extending from one end toward the other end of the case and having a guide hole; a magnet fitted around the housing; a brush base fitted into the other end of the case and having a pair of brushes spaced apart; a commutator having a contact bar which is intervened between ends of the pair of brushes; a guider provided to a free end of the contact bar for widening a distance between the ends of the pair of brushes to enable the contact bar of the commutator to be easily fitted into the pair of brushes without being obstructed by the ends of the pair of brushes; a shaft rotatably fitted into the guide hole of the housing and having one end fitted into the contact bar and the other end projecting out of the case; a coil radially separated from the magnet and receiving current through the commutator; a pair of bearings positioned inside and outside the case, respectively, for supporting the shaft; and a weight counter secured to the other end of the shaft projecting out of the case and having a center of gravity which is eccentrically defined from a center of the shaft.

7 Claims, 3 Drawing Sheets

VIBRATION MOTOR

BACKGROUND OF THE INVENTION

1. Field of the Invention

The present invention relates to a motor, and more particularly, the present invention relates to a vibration motor which is embedded into a portable phone, a beeper or the like to generate vibration as means for informing of the reception of an incoming call.

2. Description of the Related Art

In a development of a modern communication technology, personal portable communication is attracting public attention. As a representative personal portable communication device, a portable phone and a beeper can be exemplified.

In the area of personal portable communication devices, a portable phone simultaneously performs functions of a transmitter and a receiver, and a beeper only performs a function of a receiver. The portable phone and the beeper commonly have a function of informing of the reception of an incoming call.

In other words, when transmitting a message, a receiving party's portable communication device, that is, a portable phone or a beeper is informed, as an incoming call, of a condition in which a message is being inputted before the message transmitted by a portable phone or a beeper is represented by voice or characters.

A bell is most widely used as means for representing an incoming call.

While there are many kinds of bells, the bell is largely divided into a melody and a simply repeated sound.

Accordingly, a user can optionally select a kind of bell to employ in representing an incoming call, and a selected bell can be adjusted in its volume to be suited for a surrounding noise level.

However, even in the case that a volume of an incoming call is adjusted, since the incoming call still causes noise in a public place, a portable phone or a beeper can generate not only a bell, but vibration as means for informing of the reception of an incoming call.

That is to say, the incoming call can be perceived only by a user, because vibration rather than an audible bell is generated. The vibrating function can be employed by simply converting an informing mode from a bell mode to a vibrating mode.

A vibration motor is a component used as vibration generating means for informing of the reception of an incoming call by vibration.

FIG. 1 is a cross-sectional view of a conventional vibration motor.

The conventional vibration motor includes a cylindrical case 10 both ends of which are opened.

A brush base 20 which is connected via a lead wire 21 to a connector (not shown) and is formed with a through hole 22, is closely fitted into a right end of the case 10.

A housing 30 which is formed at a left end thereof with an inserting groove 31, is fastened to a left end of the case 10.

The housing 30 extends into the case 10 and is formed with a guide hole 32. The guide hole 32 is defined at a center portion of the housing 30 and is communicated with the inserting groove 31.

A commutator 40 which is selectively and electrically connected with a pair of brushes 23 of the brush base 20 to receive current therefrom, is disposed adjacent the brush base 20 inside the case 10.

The commutator 40 is provided with a contact bar 41 a right end of which is placed in the brush base 20 after passing through a space defined between ends of the pair of brushes 23 such that it is brought into contact with the ends of the pair of the brushes 23.

A shaft 50 is disposed inside the case 10. A right end of the shaft 50 is fitted into the contact bar 41 of the commutator 40 and extends to be substantially adjacent to an inner surface of the brush base 20. A left end of the shaft 50 passes through the guide hole 32 of the housing 30 and projects out of the case 10 by a predetermined length.

A magnet M is fitted around a portion of the housing 30 which extends into the case 10, and a coil C which is supplied with current from the commutator 40 is located around the magnet M such that it is radially separated by a predetermined distance from the magnet M.

The shaft 50 is rotatably supported by inside and outside oilless bearings 60 and 60' which are disposed inside and outside the case 10, respectively.

The inside oilless bearing 60 is fitted around a right end of the housing 30, and the outside oilless bearing 60' is fitted into the inserting groove 31 which is formed at the left end of the housing 30.

A weight counter 70 having a center of gravity which is eccentrically defined from a center of the shaft 50, is coupled to the left end of the shaft 50 which projects out of the case 10.

A washer W for limiting an axial movement of the shaft 50 to some extent is intervened between the weight counter 70 and a left end surface of the housing 30.

For intervening the washer W between the weight counter 70 and the housing 30, a portion of a right end surface of the weight counter 70 is depressed to a predetermined depth, as shown in FIG. 1, and the washer W is received into the depressed portion of the weight counter 70 such that it is substantially flushed with the weight counter 70.

In the vibration motor of the conventional art, constructed as mentioned above, as current is supplied from the outside through the lead wire 21, the pair of brushes 23 of the brush base 20 and the commutator 40 to the coil C, electromagnetic force is generated between the coil C and the magnet M which is fitted around the housing 30, and according to this, the shaft 50 and the weight counter 70 which are supported by the inside and outside oilless bearings 60 and 60', are rotated.

At this time, because the weight counter 70 has a center of gravity which is eccentrically defined from a center of the shaft 50, vibration is caused to be used as means for informing of the reception of an incoming call.

However, in the vibration motor of the conventional art, constructed as mentioned above, in order to place the contact bar 41 of the commutator 40 in the brush base 20, the brush base 20 must be necessarily formed with a hole which extends therethrough to communicate the outside with the inside of the case 10.

In other words, considering the fact that a distance between ends of the pair of brushes 23 of the brush base 20 is narrow and on the contrary, a diameter of the contact bar 41 is relatively large, in order to place the contact bar 41 of the commutator 40 in the brush base 20, the contact bar 41 must be inserted in a state wherein the distance between the ends of the pair of brushes 23 is widened by a jig 80 which is inserted from the outside of the brush base 20 through the through hole 22, as shown in FIG. 2.

As another example, as shown in FIG. 3, both sides of the brush base 20 are formed with a pair of through holes 22', respectively. Thereafter, a pair of jigs 80 are inserted through the pair of through holes 22', respectively, to widen the distance between the ends of the pair of brushes 23, and then, the contact bar 41 is inserted into the brush base 20.

However, in this example, when the distance between the ends of the pair of brushes 23 is widened by the pair of jigs 80, the pair of brushes 23 are likely to be deformed by the pair of jigs 80, respectively, thereby deteriorating stable contact between the pair of brushes 23 and the contact bar 41.

Also, due to the fact that a separate jig 80 is needed, as the number of components is increased, manufacturing cost is raised. Further, a process for forming the through hole 22 in the brush base 20 such that it is communicated with the inside of the case 10 and a process for widening the distance between the ends of the pair of brushes 23 must be necessarily implemented, as the number of processes is increased, assemblability is impaired.

In addition to these problems, by the presence of the washer W which is intervened between the weight counter 70 and the left end surface of the housing 30 for limiting an axial movement of the shaft 50, as the right end surface of the weight counter 70 is depressed to the predetermined depth, weight of the weight counter 70 is decreased whereby vibration capability of the weight counter 70 is lessened.

SUMMARY OF THE INVENTION

Accordingly, the present invention has been made in an effort to solve the problems occurring in the related art, and an object of the present invention is to provide a vibration motor which can accomplish a stable contact between a pair of brushes and a contact bar, and can reduce manufacturing cost and improve assemblability due to a decrease in the number of components and diminishment in effort and time.

In order to achieve the above object, according to one aspect of the present invention, there is provided a vibration motor comprising: a case; a housing extending from one end of the case toward the other end of the case to have a predetermined length, the housing having a guide hole formed therethrough; a magnet fitted around the housing; a brush base fitted into the other end of the case and having a pair of brushes which are mounted onto an inner surface thereof such that they are spaced apart by a predetermined interval; a commutator placed adjacent the brush base in the case and having a contact bar which is intervened between ends of the pair of brushes of the brush base to allow the ends of the pair of brushes to come into contact with a circumferential outer surface of the contact bar; a guider provided to a free end of the contact bar of the commutator, the guider having one end which is initially inserted between the ends of the pair of brushes and has a diameter smaller than a distance between the ends of the pair of brushes and the other end which is finally inserted between the ends of the pair of brushes and has a diameter larger than the distance between the ends of the pair of brushes, thereby widening the distance between the ends of the pair of brushes to enable the contact bar of the commutator to be easily fitted into the pair of brushes without being obstructed by the ends of the pair of brushes when it is inserted therebetween; a shaft rotatably fitted into the guide hole of the housing and having one end fitted into the contact bar of the commutator to be placed in the brush base and the other end projecting out of the case; a coil disposed such that it is radially separated from the magnet by a predetermined distance and receiving current through the commutator; a pair of bearings positioned inside and outside the case, respectively, for supporting the shaft; and a weight counter secured to the other end of the shaft projecting out of the case and having a center of gravity which is eccentrically defined from a center of the shaft.

According to another aspect of the present invention, the guider comprises a fixed part which is fixed to the contact bar of the commutator and a head part which extends integrally from the fixed part and is passed through a space defined between the ends of the pair of brushes while widening the distance between the ends of the pair of brushes such that it becomes larger than a diameter of the contact bar.

According to another aspect of the present invention, a closed stopper surface is defined on the inner surface of the brush base, to limit an axial moving distance of the shaft and the guider which is coupled to the shaft.

According to another aspect of the present invention, a distance from the guider to the stopper surface of the brush base is less than a distance between the weight counter and the case.

According to another aspect of the present invention, a side surface of the weight counter which faces the case is formed as a planar surface, to elevate vibration of the weight counter by virtue of an increase in weight of the weight counter.

According to still another aspect of the present invention, the housing is integrally formed with the case by deep-drawing one side of the case toward the other side of the case.

According to yet still another aspect of the present invention, the pair of bearings are oilless bearings which can slidably support the shaft.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
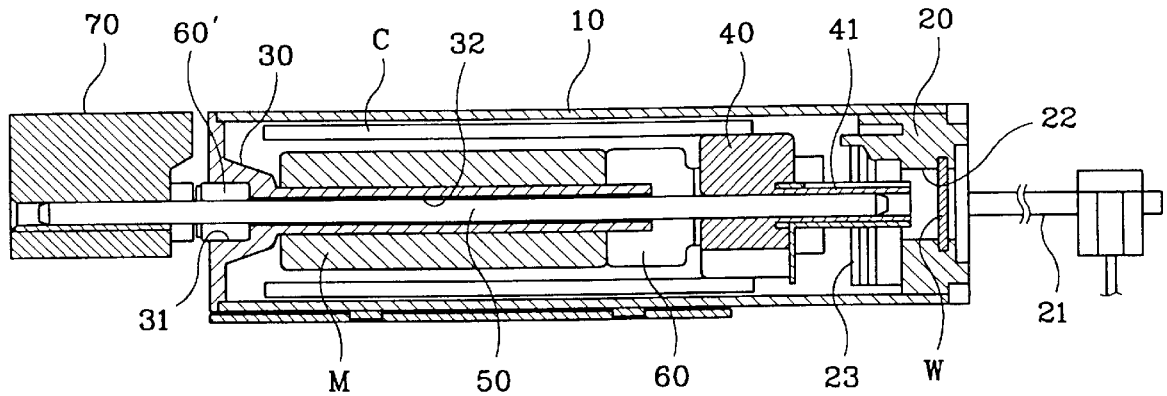
FIG. 1 is a cross-sectional view of a conventional vibration motor.
Figure 2:
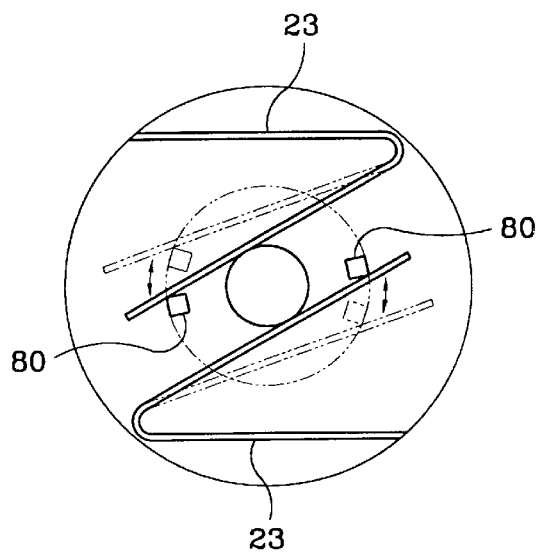
FIGS. 2 and 3 are respectively a plan view and a side view illustrating states wherein a jig is placed between ends of a pair of brushes to couple the pair of brushes with a contact bar of a commutator in the conventional vibration motor.
Figure 3:
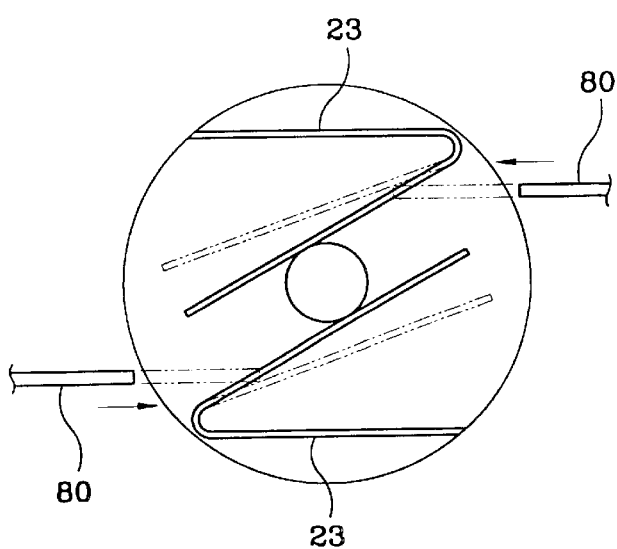

Reference will now be made in greater detail to a preferred embodiment of the invention, an example of which is illustrated in the accompanying drawings. Wherever possible, the same reference numerals will be used throughout the drawings and the description to refer to the same or like parts.

Referring to FIGS. 2 through 7, a brush base 200 which is connected via a lead wire 210 to a connector (not shown), is closely fitted into a right end of a case 100.

At this time, a pair of brushes 220 are mounted onto an inner surface of the brush base 200 such that they are spaced apart by a predetermined interval.

A housing 300 which extends toward the brush base 200 inside the case 100 to have a predetermined length and is formed with a guide hole 320, is fastened to a left end of the case 100.

While it is possible to form the housing 300 as a separate component and fasten it to the left end of the case 100, it is preferred in view of cost reduction that it is integrally formed with the case 100 by deep-drawing a multitude of times a left side of the case 100 toward a right side of the case 100.

A commutator 400 which is selectively and electrically connected with the pair of brushes 220 of the brush base 200 to receive current therefrom, is disposed adjacent the brush base 200 inside the case 100.

The commutator 400 is provided with a contact bar 410 which comes into elastic contact with the pair of brushes 220.

A guider 800 is provided to a free end of the contact bar 410 of the commutator 400. The guider 800 functions to guide the contact bar 410 free of obstructions to between the ends of the pair of brushes 220 to bring the ends of the pair of brushes 220 into elastic contact with the contact bar 410 of the commutator 400.

The guider 800 is largely divided into a fixed part 810 and a head part 820.

The fixed part 810 of the guider 800 is a part which is fixed to the contact bar 410 of the commutator 400.

The head part 820 of the guider 800 is a part which is integrally formed with the fixed part 810 and which functions to widen a distance between ends of the pair of brushes 220 such that the distance is larger than a diameter of the contact bar 410.

When observing a detailed construction of the head part 820, a right end of the head part 820 has a diameter which is smaller than the diameter of the contact bar 410 and a left end of the head part 820 has a diameter which is larger than the diameter of the contact bar 410. The head part 820 has substantially a triangle-shaped cross-section.

Figure 4:
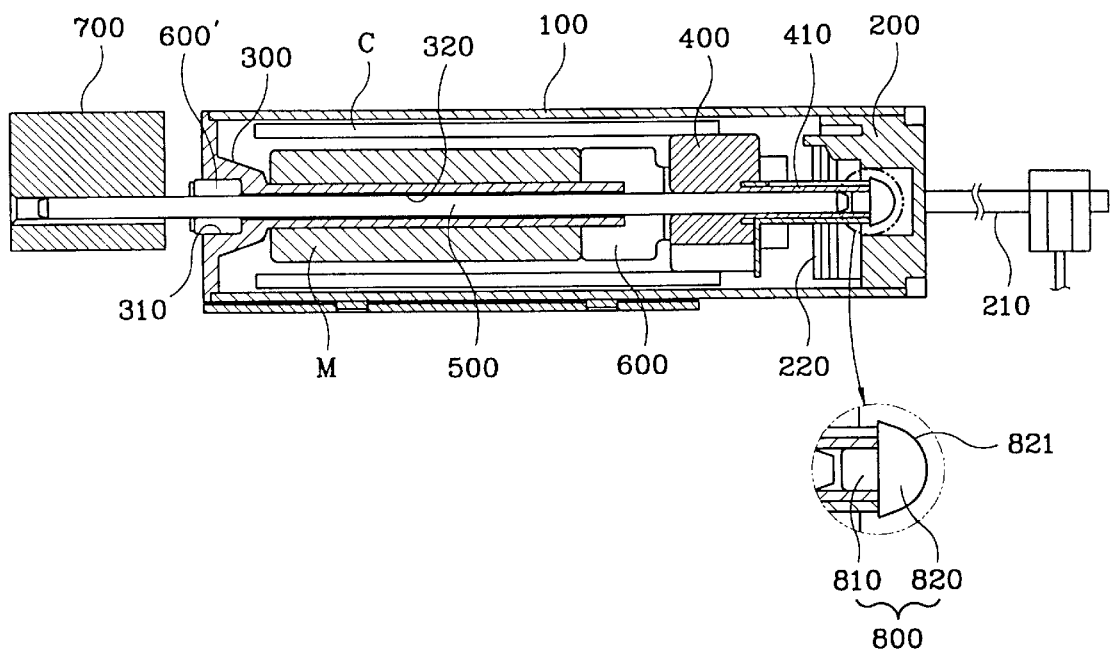
FIG. 4 is a cross-sectional view of a vibration motor in accordance with an embodiment of the present invention.

However, a cross-section of the head part 820 is not limited to the triangle-shaped cross-section. As shown in FIG. 4 and as described above, the right end of the head part 820 has a diameter which is smaller than the diameter of the contact bar 410 and the left end of the head part 820 has a diameter which is larger than the diameter of the contact bar 410. Between the right and left ends of the head part 820! there is defined a rounded or inclined surface 821.

At this time, it is preferred that the inclined surface 821 has an inclination angle less than 90° and a predetermined curvature.

Figure 6:
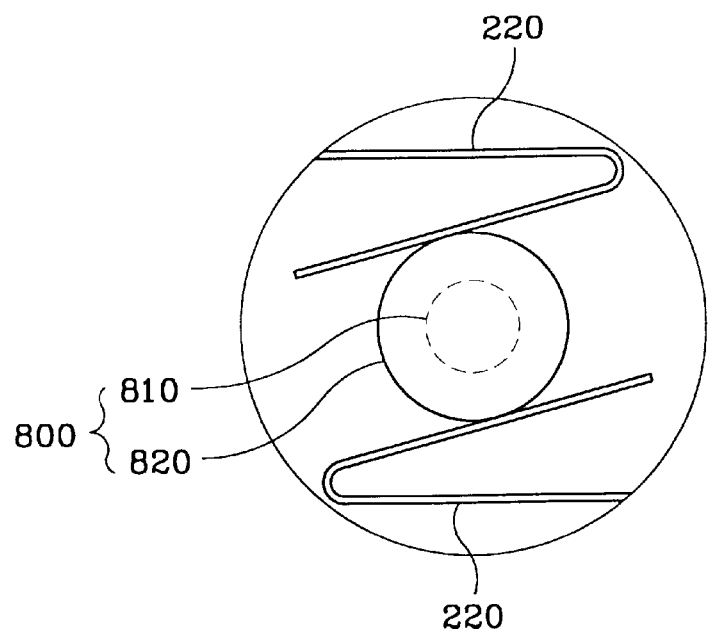
FIGS. 6 and 7 are plan views for explaining a procedure in which a pair of brushes are coupled with a contact bar of a commutator in the vibration motor according to the present invention.
Figure 7:
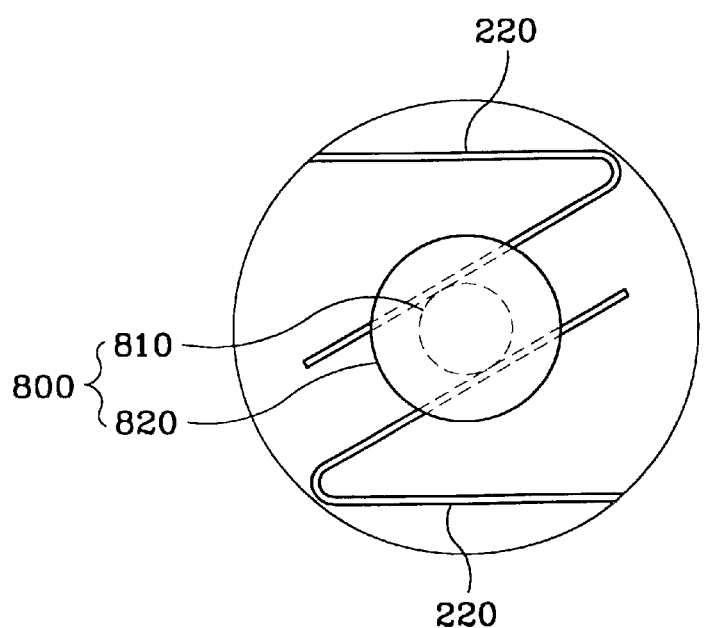

In the above construction, when placing the contact bar 410 in the brush base 200, if the contact bar 410 of the commutator 400 is forced to move toward the brush base 200, as shown in FIGS. 6 and 7, the ends of the pair of brushes 220 are gradually biased outward by the head part 820 of the guider 800. Then, if the left end of the head part 820 is brought into contact with the ends of the pair of brushes 220, the distance between the ends of the pair of brushes 220 is widened such that it becomes larger than the diameter of the contact bar 410.

Accordingly, if the contact bar 410 is slightly moved rightward from the above state, the pair of brushes 220 are elastically contacted onto a circumferential outer surface of the contact bar 410.

As a result, through an assembling operation by which the contact bar 410 is fitted and inserted into the brush base 200, stable contact between the pair of brushes 220 and the contact bar 410 is ensured.

At this time, the inner surface of the brush base 200 which faces the guider 800, defines a stopper surface 230 which can be contacted with the head part 820 of the guider 800.

Figure 5:
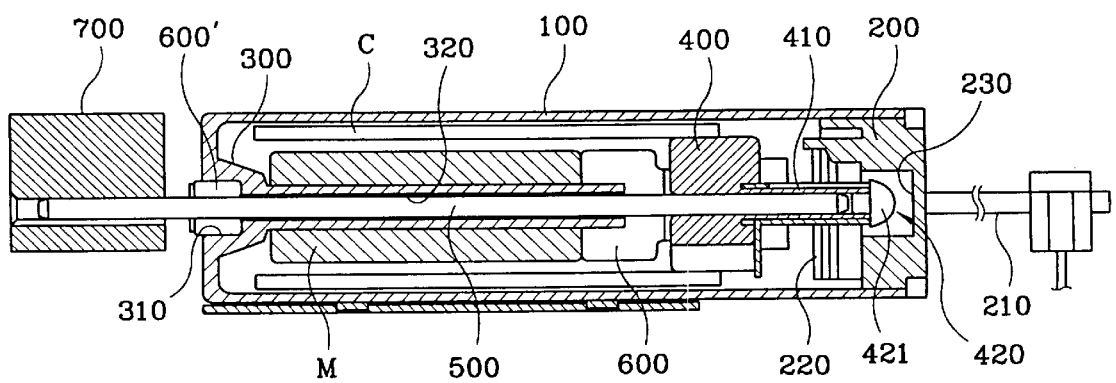
FIG. 5 is a cross-sectional view of a vibration motor in accordance with another embodiment of the present invention.

While it is possible to form the stopper surface 230 by intervening a washer W between the contact bar 410 and the brush base 200 as shown in FIG. 4, it is preferred in view of cost reduction that the stopper surface 230 is formed by closing a right end of the brush base 200 as shown in FIG. 5.

That is to say, as shown in FIG. 5, the reason why it is possible to close the right end of the brush base 200 is in that the right end of the brush base 200 may be opened in the conventional art to define a through hole through which a jig can be inserted into the case 100, and on the contrary, in the present invention, it is not necessary to open the right end of the brush base 200 because the jig is not used to widen the distance between the ends of the pair of brushes 220.

A shaft 500 is positioned in the case 100. A right end of the shaft 500 is fitted into the contact bar 410 of the commutator 400 to extend into the brush base 200, and a left end of the shaft 500 is rotatably inserted into the guide hole 320 of the housing 300 and projects out of the case 100 by a predetermined length.

A magnet M is fitted around a portion of the housing 300 which extends into the case 100, and a coil C, which is supplied with current from the commutator 400, is located around the magnet M such that it is radially separated by a predetermined distance from the magnet M.

The shaft 500 is rotatably supported by a pair of bearings which are disposed inside and outside the case 100, respectively. In the present invention, in order to improve rotation precision of the shaft 500, a pair of oilless bearings 600 and 600' are used for rotatably supporting the shaft 500.

The inside oilless bearing 600 is fitted around a right end of the housing 300, and the outside oilless bearing 600' is fitted into an inserting groove 310 which is formed at a left end of the housing 300.

A weight counter 700 having a center of gravity which is eccentrically defined from a center of the shaft 500, is coupled to the left end of the shaft 500 which projects out of the case 100.

On the other hand, it is necessary to limit an axial movement of the shaft 500.

Namely, the shaft 500 is limited in its axial movement to be prevented from being removed from the housing 300 and to prevent components inside the case 100 from coming into contact one with another.

This limitation in the axial movement of the shaft 500 is effected by the contact among the inside oilless bearing 600, the head part 820 of the guider 800 and the stopper surface 230.

In other words, when viewed in an axial direction, limitation in an axial rightward movement is effected by the contact between the stopper surface 230 of the brush base 200 and the head part 820 of the guider 800, and limitation in an axial leftward movement is effected by the fact that the commutator 400 is brought into contact with the inside oilless bearing 600.

In the meanwhile, a distance between the head part 820 and the stopper surface 230 which is used in limiting the axial rightward movement, must be established such that it is less than a distance between a left end surface of the housing 300 and a right end surface of the weight counter 700.

This is because, if the distance between the head part 820 and the stopper surface 230 is greater than the distance between the left end surface of the housing 300 and the right end surface of the weight counter 700, when the shaft 500 is moved rightward, the weight counter 700 may be brought into contact with the housing 300 and/or the case 100 thereby generating abnormal noise.

On the other hand, by the present invention, due to the fact that the rightward axial movement of the shaft 500 is limited by the contact between the head part 820 and the stopper surface 230, it is possible to eliminate the washer W which is intervened between the weight counter 700 and the case 100 for limiting the rightward axial movement in the conventional art.

Due to the fact that the washer W is eliminated as described above, it is not necessary to machine the right end surface of the weight counter 700 for mounting the washer W, whereby the right end surface of the weight counter 700 can be shaped as a planar surface.

Accordingly, by the fact that the right end surface of the weight counter 700 is shaped as a planar surface, when compared to the conventional art, weight of the weight counter 700 can be increased, whereby vibration of the weight counter can be multiplied.

In the vibration motor of the present invention, constructed as mentioned above, as current is supplied from the outside through the lead wire 210, the pair of brushes 220 of the brush base 200 and the commutator 400 to the coil C, electromagnetic force is generated between the coil C and the magnet M which is fitted around the housing 300, and according to this, the shaft 500 and the weight counter 700 which are supported by the inside and outside oilless bearings 600 and 600', are rotated.

At this time, because the weight counter 700 has a center of gravity which is eccentrically defined from a center of the shaft 500, vibration is caused to be used as means for informing of the reception of an incoming call.

As described above, by a vibration motor according to the present invention, a stable contact between a pair of brushes and a contact bar of a commutator can be easily accomplished by inserting the contact bar of the commutator into a brush base and through a guider which is attached to the contact bar of the commutator.

Therefore, due to the fact that a separate jig for widening a distance between the pair of brushes is not needed and it is not necessary to form a through hole in the brush base, manufacturing cost is reduced and assemblability is improved.

Besides, vibration of the weight counter is multiplied by virtue of an increase in weight of the weight counter.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A vibration motor comprising:

a case having near and remote ends;

a housing extending within the case from the near end of the case toward the remote end of the case and having a predetermined length, the housing having a guide passage formed therethrough;

a magnet fitted around the housing;

a brush base fitted into the remote end of the case and having a pair of brushes which are mounted onto an inner surface thereof, each brush having an end and the brush ends being spaced apart by a predetermined distance;

a commutator placed adjacent the brush base within the case and having a contact bar extending within the case which is interposed between the ends of the brushes to allow the ends of the brushes to come into contact with an outer surface of the contact bar;

a guider provided at a remote end of the contact bar, the guider having a remote end having a girth smaller than the predetermined distance and a near end having a girth larger than the predetermined distance so that moving the guider toward, and between the brushes in the remote direction causes widening of the distance between the ends of the brushes, to enable the contact bar of the commutator to be moved easily in the remote direction towards and fitted between the pair of brushes without being obstructed by the ends of the pair of brushes;

a shaft rotatably fitted in the guide passage of the housing and having one end fitted into the contact bar of the commutator to be placed in the brush base and the other end projecting out of the near end of the case;

a coil disposed such that it is radially separated from the magnet by a predetermined distance and receiving current through the commutator;

a pair of bearings positioned inside and outside the case, respectively, for supporting the shaft; and a weight counter secured to the near end of the shaft projecting out of the case and having a center of gravity which is eccentrically defined from a center of the shaft.

2. A vibration motor as claimed in claim 1, wherein the guider comprises a fixed part which is fixed to the contact bar of the commutator and a head part which extends integrally from the fixed part and is passed through a space defined between the ends of the pair of brushes while widening the distance between the ends of the pair of brushes such that it becomes larger than the girth of the contact bar.

3. A vibration motor as claimed in claim 1, wherein a closed stopper surface is defined on the inner surface of the brush base, to limit an axial moving distance of the shaft and the guider which is coupled to the shaft.

4. A vibration motor as claimed in claim 3, wherein a distance from the guider to the stopper surface of the brush base is less than a distance between the weight counter and the case.

5. A vibration motor as claimed in claim 1, wherein a side surface of the weight counter which faces the case is formed as a planar surface, to multiply vibration of the weight counter by virtue of an increase in weight of the weight counter.

6. A vibration motor as claimed in claim 1, wherein the housing is integrally formed with the case by deep-drawing one side of the case toward the other side of the case.

7. A vibration motor as claimed in claim 1, wherein the pair of bearings are oilless bearings which can slidably support the shaft.

* * * * *